(12) United States Patent
Gonzales, Jr.

(10) Patent No.: US 11,113,903 B2
(45) Date of Patent: Sep. 7, 2021

(54) VEHICLE MONITORING

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/396,863

(22) Filed: Apr. 29, 2019

(65) Prior Publication Data

US 2019/0251763 A1 Aug. 15, 2019

Related U.S. Application Data

(63) Continuation of application No. 15/186,974, filed on Jun. 20, 2016, now Pat. No. 10,388,086, which is a continuation-in-part of application No. 14/986,243, filed on Dec. 31, 2015.

(51) Int. Cl.

| G07C 5/08 | (2006.01) |
|---|---|
| G06F 16/638 | (2019.01) |
| G06F 16/63 | (2019.01) |
| G06F 16/683 | (2019.01) |
| G07C 5/00 | (2006.01) |
| H04R 29/00 | (2006.01) |
| G10L 25/21 | (2013.01) |
| G10L 25/18 | (2013.01) |
| G10L 25/51 | (2013.01) |

(52) U.S. Cl.
CPC .......... *G07C 5/0808* (2013.01); *G06F 16/63* (2019.01); *G06F 16/638* (2019.01); *G06F 16/683* (2019.01); *G07C 5/006* (2013.01); *G07C 5/0816* (2013.01); *G10L 25/18* (2013.01); *G10L 25/21* (2013.01); *G10L 25/51* (2013.01); *H04R 29/00* (2013.01)

(58) Field of Classification Search
None
See application file for complete search history.

(56) References Cited

U.S. PATENT DOCUMENTS

| 6,249,215 B1 | 6/2001 | Dilz et al. |
|---|---|---|
| 6,775,642 B2 | 8/2004 | Remboski et al. |
| 7,103,460 B1 * | 9/2006 | Breed ................. B60C 23/0408 701/29.1 |
| 7,904,219 B1 | 3/2011 | Lowrey et al. |

(Continued)

FOREIGN PATENT DOCUMENTS

| CN | 1661348 A | 8/2005 |
|---|---|---|
| CN | 102486646 A | 6/2012 |

(Continued)

OTHER PUBLICATIONS

Non-Final Office Action received for U.S. Appl. No. 16/217,389, dated Jun. 25, 2019, 17 pages.

(Continued)

*Primary Examiner* — Qin Zhu
(74) *Attorney, Agent, or Firm* — Holland & Hart LLP

(57) ABSTRACT

Methods, systems, and apparatus for determining a maintenance issue are described. An audio signal is obtained and analyzed to generate an audio signature. A characteristic of a component is identified based on the audio signature and an action is determined based on the characteristic of the component.

20 Claims, 12 Drawing Sheets

(56) References Cited

U.S. PATENT DOCUMENTS

| | | | |
|---|---|---|---|
| 8,874,305 B2 | 10/2014 | Dolgov et al. | |
| 8,983,677 B2 | 3/2015 | Wright et al. | |
| 9,129,460 B2 | 9/2015 | McClellan et al. | |
| 9,843,877 B2 | 12/2017 | Gonzales, Jr. | |
| 10,176,647 B2 | 1/2019 | Gonzales, Jr. | |
| 10,388,086 B2 | 8/2019 | Gonzales, Jr. | |
| 10,957,129 B2 | 3/2021 | Gonzales, Jr. | |
| 2004/0015251 A1 | 1/2004 | Hamada et al. | |
| 2004/0136539 A1 | 7/2004 | Uhi et al. | |
| 2005/0192723 A1 | 9/2005 | Noguchi | |
| 2006/0253282 A1* | 11/2006 | Schmidt | G07C 5/0808 704/233 |
| 2007/0038448 A1 | 2/2007 | Sherony | |
| 2007/0093947 A1 | 4/2007 | Gould et al. | |
| 2007/0271014 A1 | 11/2007 | Breed | |
| 2008/0030313 A1 | 2/2008 | Obradovich | |
| 2008/0201032 A1 | 8/2008 | Fayyad et al. | |
| 2008/0319602 A1 | 12/2008 | McClellan et al. | |
| 2009/0177354 A1 | 7/2009 | Agrawal et al. | |
| 2010/0080086 A1 | 4/2010 | Wright et al. | |
| 2010/0114423 A1 | 5/2010 | Boss et al. | |
| 2010/0134296 A1 | 6/2010 | Hwang | |
| 2010/0142715 A1 | 6/2010 | Goldstein et al. | |
| 2010/0217684 A1 | 8/2010 | Melcher et al. | |
| 2011/0112717 A1 | 5/2011 | Resner | |
| 2011/0130915 A1 | 6/2011 | Wright et al. | |
| 2012/0071151 A1 | 3/2012 | Abramson et al. | |
| 2012/0083959 A1 | 4/2012 | Dolgov et al. | |
| 2012/0089299 A1 | 4/2012 | Breed | |
| 2012/0143431 A1 | 6/2012 | Kim et al. | |
| 2012/0226390 A1* | 9/2012 | Adams | G07C 5/008 701/1 |
| 2012/0330499 A1 | 12/2012 | Scheid et al. | |
| 2013/0055300 A1 | 2/2013 | Hanina | |
| 2013/0290018 A1 | 10/2013 | Anderson et al. | |
| 2014/0086419 A1 | 3/2014 | Rana et al. | |
| 2015/0120336 A1 | 4/2015 | Grokop et al. | |
| 2015/0170439 A1 | 6/2015 | Chen et al. | |
| 2015/0218872 A1* | 8/2015 | Breed | G01C 21/26 701/2 |
| 2015/0269792 A1 | 9/2015 | Wood | |
| 2015/0371462 A1 | 12/2015 | Ramesh | |
| 2016/0104486 A1 | 4/2016 | Penilla et al. | |
| 2016/0163130 A1 | 6/2016 | Zagajac et al. | |
| 2016/0196264 A1 | 7/2016 | Bostick et al. | |
| 2016/0343180 A1 | 11/2016 | Talwar et al. | |
| 2017/0050750 A1 | 2/2017 | Barraci et al. | |
| 2017/0109944 A1 | 4/2017 | Barajas Gonzalez et al. | |
| 2017/0193714 A1 | 7/2017 | Gonzales, Jr. | |
| 2017/0195810 A1 | 7/2017 | Gonzales, Jr. | |
| 2018/0089913 A1 | 3/2018 | Gonzales, Jr. | |
| 2018/0310780 A1 | 11/2018 | Mahaffey et al. | |
| 2019/0114850 A1 | 4/2019 | Gonzales, Jr. | |
| 2019/0164565 A1 | 5/2019 | Jones et al. | |

FOREIGN PATENT DOCUMENTS

| | | | |
|---|---|---|---|
| JP | 2013200143 A | 10/2013 | |
| KR | 10-2015-0146025 A | 12/2015 | |
| WO | 2017223108 A1 | 12/2017 | |

OTHER PUBLICATIONS

International Preliminary Report on Patentability received for PCT Application No. PCT/US2017/038370, dated Jan. 3, 2019, 7 Pages.
International Search Report received for PCT Application No. PCT/US2017/038370, dated Oct. 13, 2017, 2 Pages.
International Written Opinion received for PCT Application No. PCT/US2017/038370, dated Oct. 13, 2017, 5 Pages.
Applicant Initiated Interview summary received for U.S. Appl. No. 14/986,243, dated Apr. 12, 2017, 3 Pages.
Non-Final Office Action received for U.S. Appl. No. 14/986,243, dated Mar. 9, 2017, 12 Pages.
Notice of Allowance received for U.S. Appl. No. 14/986,243, dated Aug. 9, 2017, 5 Pages.
Response to Non-Final Office Action filed on Jul. 20, 2017 for U.S. Appl. No. 14/986,243, dated Mar. 9, 2017, 10 pages.
Non-Final Office Action Received for U S. Appl. No. 15/827,872 dated Apr. 5, 2018, 11 pages.
Applicant Initiated Interview Summary received for U.S. Appl. No. 15/827,872, dated Jun. 20, 2018, 3 Pages.
Notice of Allowance received for U.S. Appl. No. 15/827,872, dated Aug. 29, 2018, 5 Pages.
Response to Non-Final Office Action filed on Jul. 2, 2018, for U.S. Appl. No. 15/827,872, dated Apr. 5, 2018, 8 Pages.
Madain, et al., "Fault Diagnosis in Vehicle Engines Using Sound Recognition Techniques", 2010, pp. 1-4.
Advisory Action received for U.S. Appl. No. 15/186,974, dated Aug. 28, 2018, 3 Pages.
Applicant Initiated Interview Summary Received for U.S. Appl. No. 15/186,974 dated Nov. 27, 2017, 3 Pages.
Applicant Initiated Interview Summary received for U.S. Appl. No. 15/186,974, dated Aug. 28, 2018, 3 Pages.
Applicant Initiated Interview Summary received for U.S. Appl. No. 15/186,974, dated Feb. 20, 2018, 3 Pages.
Final Office Action received for U.S. Appl. No. 15/186,974, dated Jun. 13, 2018, 11 Pages.
Final Office Action received for U.S. Appl. No. 15/186,974, dated Sep. 18, 2017, 12 Pages.
Response to Final Office Action filed on Nov. 30, 2017 for U.S. Appl. No. 15/186,974 dated Sep. 18, 2017, 8 Pages.
First Action Interview—Pre-Interview Communication received for U.S. Appl. No. 15/186,974, dated Jul. 10, 2017, 5 Pages.
First Action Interview-Office Action Summary received for U.S. Appl. No. 15/186,974, dated Aug. 7, 2017, 6 Pages.
Non-Final Office Action received for U.S. Appl. No. 15/186,974, dated Dec. 26, 2017, 9 Pages.
Response to Non-final Office Action filed on Mar. 26, 2018, for U.S. Appl. No. 15/186,974, dated Dec. 26, 2017, 10 Pages.
Notice of Allowance received for U.S. Appl. No. 15/186,974, dated Dec. 18, 2018, 9 Pages.
Notice of Allowance received for U.S. Appl. No. 15/186,974, dated Feb. 6, 2019, 5 Pages.
Preliminary Amendment received for U.S. Appl. No. 15/186,974 dated Jun. 20, 2017, 3 Pages.
Response to Advisory Action filed on Sep. 13, 2018 for U.S. Appl. No. 15/186,974, dated Aug. 28, 2018, 8 Pages.
Response to Final Office Action filed on Aug. 6, 2018, for U.S. Appl. No. 15/186,974, dated Jun. 13, 2018, 7 Pages.
Voluntary Amendment filed on Apr. 26, 2019, for Chinese Patent Application No. 201780037933.X, 6 Pages (3 pages of Official Copy and 3 pages of English Pending Claims).
Final Office Action received for U.S. Appl. No. 16/217,389, dated Nov. 21, 2019, 10 pages.
Response to Non-Final Office Action filed on Sep. 25, 2019, for U.S. Appl. No. 16/217,389, dated Jun. 25, 2019, 13 pages.
Advisory Action received for U.S. Appl. No. 16/217,389, dated Jan. 22, 2020, 3 pages.
Response to Final Office Action filed on Jan. 14, 2020, for U.S. Appl. No. 16/217,389, dated Nov. 21, 2019, 11 pages.
Extended European Search Report received for European Patent Application No. 17816076.8, dated Jan. 21, 2020, 11 pages.
Response to Office Action filed on Mar. 6, 2020, for Korean Patent Application No. 10-2019-7001789, dated Jan. 6, 2020, 13 pages (10 pages of Official Copy & 3 pages of English Pending Claims).
Office Action received for Chinese Patent Application No. 201780037933.X, dated Mar. 4, 2020, 14 pages (7 pages of Official Copy and 7 pages of English Translation).
Office Action received for Korean Patent Application No. 10-2019-7001789, dated Jan. 6, 2020, 10 pages (5 Page of Official Copy and 5 Pages of English Translation).
Non Final Office Action Received for U.S. Appl. No. 16/217,389, dated Apr. 15, 2020, 14 pages.
Office Action Received for Korean Patent Application No. 10-2019-7001789, dated Jul. 30, 2020, 7 pages (4 Pages of Official Copy and 3 Pages of English Translation).

(56) References Cited

OTHER PUBLICATIONS

Response to Office Action filed on Sep. 29, 2020, for Korean Patent Application No. 10-2019-7001789, dated Jul. 30, 2020, 46 pages (43 pages of Official copy & 3 pages of English translation of Claims Copy).
Applicant Initiated Interview Summary received for U.S. Appl. No. 16/217,389, dated Sep. 22, 2020, 3 Pages.
Final Office Action received for U.S. Appl. No. 16/217,389, dated Aug. 4, 2020, 8 pages.
Response to Final Office Action filed on Oct. 1, 2020 for U.S. Appl. No. 16/217,389, dated Aug. 4, 2020, 11 pages.
Response to Non-Final Office Action filed on Jul. 14, 2020 for U.S. Appl. No. 16/217,389, dated Apr. 15, 2020, 15 Pages.
Response to Extended European Search Report Filed on Aug. 10, 2020, for European Patent Application No. 17816076.8, dated Jan. 21, 2020, 9 pages.
Response to Office Action Filed on Jul. 14, 2020, for Chinese Patent Application No. 201780037933.X, dated Mar. 4, 2020, 10 Pages (7 Pages of Official Copy & 3 pages of English Claims).
Notice of Allowance received for U.S. Appl. No. 16/217,389, dated Oct. 22, 2020, 7 pages.
Office Action received for Chinese Patent Application No. 201780037933.X, dated Nov. 17, 2020, 18 pages (10 pages of English Translation and 8 pages of Official copy only).
Corrected Notice of Allowability Received for U.S. Appl. No. 16/217,389, dated Jan. 26, 2021, 2 Pages.
Corrected Notice of Allowability Received for U.S. Appl. No. 16/217,389, dated Feb. 22, 2021, 2 Pages.
Office Action received for Korean Patent Application No. 10-2021-7003692,dated Apr. 8, 2021, 7 Pages (4 official Copy & 3 Pages of English Translation).

\* cited by examiner

| Time | Speed |
|---|---|
| 1/1/2016 7:01 | 25 |
| 1/1/2016 7:02 | 30 |
| 1/1/2016 7:02 | 35 |
| 1/1/2016 7:03 | 40 |
| 1/1/2016 7:06 | 41.27 |
| 1/1/2016 7:07 | 40 |
| 1/1/2016 7:07 | 35 |
| 1/1/2016 7:08 | 10 |
| 1/1/2016 7:11 | 10 |
| 1/1/2016 7:12 | 0 |
| 1/1/2016 8:01 | 30 |

| Time | Acceleration |
|---|---|
| 1/1/2016 7:01 | 1 |
| 1/1/2016 7:02 | 1 |
| 1/1/2016 7:02 | 1.21 |
| 1/1/2016 7:03 | 0 |
| 1/1/2016 7:06 | 0 |
| 1/1/2016 7:07 | 0 |
| 1/1/2016 7:07 | 0 |
| 1/1/2016 7:08 | 0 |
| 1/1/2016 7:11 | 2.12 |
| 1/1/2016 7:12 | 1 |
| 1/1/2016 8:01 | 0 |

| Time | Deceleration |
|---|---|
| 1/1/2016 7:01 | 0 |
| 1/1/2016 7:02 | 0 |
| 1/1/2016 7:02 | 0 |
| 1/1/2016 7:03 | 1 |
| 1/1/2016 7:06 | 1 |
| 1/1/2016 7:07 | 1.05 |
| 1/1/2016 7:07 | 2.23 |
| 1/1/2016 7:08 | 0 |
| 1/1/2016 7:11 | 0 |
| 1/1/2016 7:12 | 0 |
| 1/1/2016 8:01 | 0 |

| Identifier | Signature | Object Type | Characteristic 1 | Characteristic 2 |
|---|---|---|---|---|
| 100 | 255603 | TIRE | EXPOSED BELT | |
| 101 | 255605 | TIRE | EXPOSED BELT | LOW AIR |
| 102 | 255606 | WATER PUMP | WORN BEARING | |
| 103 | 255708 | WATER PUMP | | |
| 104 | 255608 | TRANSMISSION | | |
| 105 | 255720 | MUFFLER | | |
| 106 | 255606 | BEARINGS | | |
| 107 | 255607 | BEARINGS | | |
| 108 | 255606 | BEARINGS | | |
| | | | | |
| | | | | |

FIG. 7

| Maintenance | Audio Signature | Location | Speed | Acceleration | Temp's |
|---|---|---|---|---|---|
| Replace Tire | 255603 | | | | |
| Change Oil | | Tropical | | | |
| Inspect Water Pump | 255789 | | | | > 200 |
| Replace Wheel Bearings | 255869 | | >55 | | |
| | | | | | |
| | | | | | |
| | | | | | |
| | | | | | |
| | | | | | |

FIG. 10

VEHICLE MONITORING

PRIORITY

This application is a continuation of U.S. application Ser. No. 15/186,974, filed Jun. 20, 2016, which is a continuation in part of U.S. patent application Ser. No. 14/986,243, filed Dec. 31, 2015, each of which is hereby incorporated by reference herein in its entirety.

TECHNICAL FIELD

The present application relates generally to monitoring a machine, and more specifically, in one example, to identifying maintenance issues based on monitoring a vehicle.

BACKGROUND

Machines, such as vehicles, are periodically inspected to determine the condition of various components of the machine and to identify maintenance items needed to maintain the machine to defined safety and performance standards. For example, brake pads of a vehicle may be inspected to determine if they are at the end of life. If they are not replaced, the safety of the passengers may be compromised and damage to other vehicle components, such as the vehicle's rotors, may be risked. Near the end of life, the brake pads may emit a unique sound to alert the driver to the condition of the brake pads; however, this sound may be ignored or unrecognized by a driver of the vehicle. Similarly, the end of life of a tire may be recognized by visual inspection. Again, an unaware or uneducated driver may fail to recognize the warning signs of a worn tire and may fail to have the vehicle professionally inspected.

BRIEF DESCRIPTION OF THE DRAWINGS

Some embodiments are illustrated by way of example and not limitation in the figures of the accompanying drawings, in which:

FIG. 3A is an example speed data structure for logging the speed of the vehicle provided by a speed and acceleration detection system in a speed vector, in accordance with an example embodiment;

FIG. 3B is an example acceleration data structure for logging instances of acceleration provided by the speed and acceleration detection system in an acceleration vector, in accordance with an example embodiment;

FIG. 3C is an example deceleration data structure for logging instances of deceleration provided by the speed and acceleration detection system in a deceleration vector, in accordance with an example embodiment;

FIG. 7 is an example audio signature data structure for determining a maintenance issue based on a monitored sound, in accordance with an example embodiment;

FIG. 10 is an example maintenance identification data structure for identifying a maintenance issue based on an audio signature, a vehicle location, a speed of a vehicle, an acceleration of a vehicle, a temperature, and the like, in accordance with an example embodiment;

DETAILED DESCRIPTION

Figure 1:
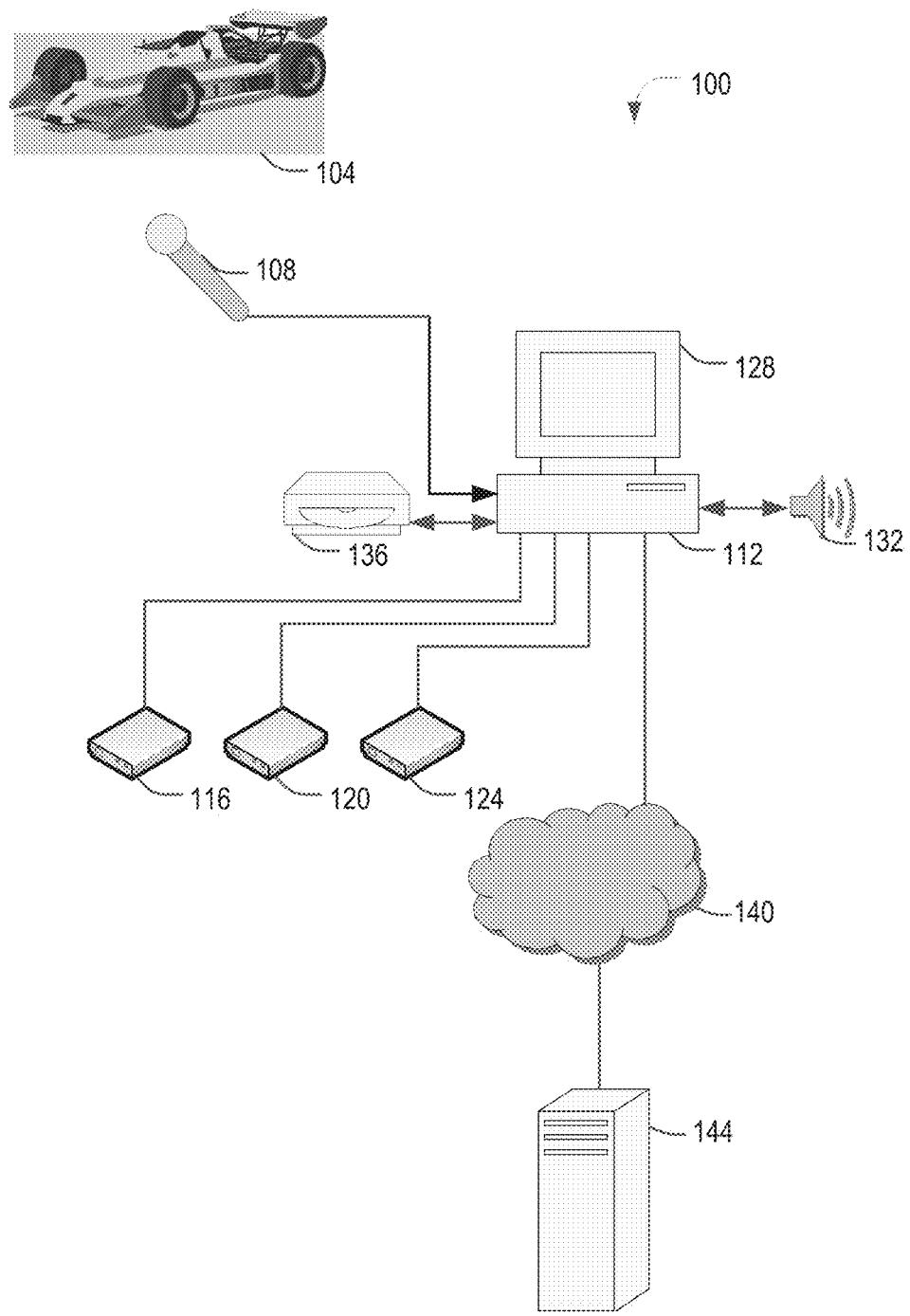
FIG. 1 is a block diagram of an example system for monitoring a vehicle, in accordance with an example embodiment.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for monitoring a vehicle are disclosed. In one example embodiment, the location, speed, acceleration, temperature, sounds, and the like of a vehicle are monitored and analyzed to determine a condition of the vehicle and to recommend a maintenance activity. The location of the vehicle may, for example, be indicative of the vehicle's climate and may indicate the type of motor oil that is recommended for the engine. For example, a tropical climate may indicate the need for a heavier motor oil. The speed or acceleration of the vehicle may, for example, be indicative of a driver's style of driving and may indicate a pace of tire wear. The sounds of the vehicle may, for example, be indicative of a condition of a tire, an engine belt, a water pump, and the like and may indicate a need to replace the corresponding component.

A "sound," as used herein, includes sounds detectable by a human ear, as well as sounds detectable by electronic equipment, such as a microphone. In one example embodiment, a sound emitted by the vehicle is monitored and captured to create an audio signal. The audio signal may be optionally pre-processed to, for example, eliminate background noise, isolate a particular sound, clarify the audio signal, or any combination thereof, and then processed to generate an audio fingerprint. The audio fingerprint (also known as an audio signature, or signature, hereinafter) is compared to audio signatures in a library of signatures. If a match is found, the monitored component is identified as being the component that corresponds to the signature in the library, as being of the component type that corresponds to the signature in the library, as having a characteristic(s) that corresponds to the signature in the library, or any combination thereof.

A speed of the vehicle may be detected using a speedometer, a global positioning system (GPS) receiver, cellular triangulation, and the like. An acceleration of the vehicle may be detected using an accelerometer, a GPS receiver, cellular triangulation, and the like. A location of the vehicle may be defined by latitude and longitude, street address, and the like and may be determined using a GPS receiver, cellular triangulation, and the like.

In one example embodiment, training is conducted to introduce new audio signatures into the signature library. A monitored sound emitted by a known component is captured to create an audio signal. The audio signal may be optionally pre-processed and processed to generate the audio signature. The signature is stored in the signature library and is indexed according to the identity of the component, the component type, a characteristic(s) of the component, and the like.

In one example embodiment, a signature, or "fingerprint," of the audio signal is generated. The signature is generated by considering characteristics of an audio waveform, such as frequency range, tempo (e.g., beats per minute), acoustic resonances, power in each of a plurality of frequency ranges, and the like. The signature may be compared to audio signatures in a library of signatures. If a match is found, the signature is identified as being the component corresponding to the library signature, as being of the component type corresponding to the library signature, as having the characteristic(s) of the component corresponding to the library signature, or any combination thereof. The library may be stored in a database, an archival system, and the like.

In one example embodiment, an action may be recommended, performed, or both based on the audio signature, the location of the vehicle, the speed of the vehicle, the acceleration of the vehicle, a temperature associated with the vehicle, and the like. An item or service associated with the identified component may also be identified based on the audio signature, the location of the vehicle, the speed of the vehicle, the acceleration of the vehicle, a temperature associated with the vehicle, and the like. For example, wheel bearings of an automobile may emit a distinctive sound just prior to failure. The sounds emitted by the wheel bearings may be captured and processed to identify the condition of the wheel bearings. Maintenance activities, such as replacing the wheel bearings, may then be determined and recommended. The recommendation may also be submitted to a user, a service company, and the like.

FIG. 1 is a block diagram of an example system 100 for monitoring a vehicle 104, in accordance with an example embodiment. In one example embodiment, the system 100 may comprise a microphone 108, a location detection system 116, a speed and acceleration detection system 120, a temperature sensor system 124, and a vehicle monitor 112.

The microphone 108 captures sounds emitted by a component of the vehicle. The captured sound is converted into an audio signal by the microphone 108 for processing by the vehicle monitor 112. In one example embodiment, the microphone 108 may communicate with, for example, the vehicle monitor 112 via a wireless link (e.g., IEEE 802.11), a wired link, and the like.

The location detection system 116 identifies a location of the vehicle (also known as a waypoint herein) based on cellular triangulation, GPS data, and the like. The speed and acceleration detection system 120 detects the speed and acceleration of the vehicle. As used herein, deceleration is acceleration characterized by a negative value. A waypoint vector stores the location of the vehicle based on time of day, as indicated by reports from the location detection system 116. A speed vector stores the speed of the vehicle based on time of day, as indicated by reports from the speed and acceleration detection system 120. An acceleration vector stores instances of vehicle acceleration that exceed a predefined threshold, as indicated by reports from the speed and acceleration detection system 120. A deceleration vector stores instances of vehicle deceleration that exceed a predefined threshold, as indicated by reports from the speed and acceleration detection system 120. An acceleration histogram may be generated to show the number of occurrences of acceleration for each of a plurality of acceleration ranges. A deceleration histogram may be generated to show the number of occurrences of deceleration for each of a plurality of deceleration ranges.

The temperature sensor system 124 detects the outdoor temperature of the vehicle. In one example embodiment, the temperature sensor system 124 detects the indoor temperature (cabin temperature) of the vehicle and temperatures of various vehicle components, such as coolant temperature, transmission fluid temperature, brake temperature, and the like.

The vehicle monitor 112 may be a computer processing system, a server computer, a personal computer (PC), a tablet PC, a personal digital assistant (PDA), a cellular telephone, a smartphone, a smartwatch, or any processing device. In some embodiments, the computer processing system operates as a standalone device or may be connected (e.g., networked) to other computers 144. In a networked deployment, the computer processing system may operate in the capacity of a server or a client computer in server-client network environment, or as a peer computer in a peer-to-peer (or distributed) network environment.

The vehicle monitor 112 may include a processor (e.g., a central processing unit (CPU), a graphics processing unit (GPU), and the like) and a memory, which communicate with each other via a bus. The vehicle monitor 112 may further include a video display 128 (e.g., a plasma display, a liquid crystal display (LCD), or a cathode ray tube (CRT)). The vehicle monitor 112 may also include an alphanumeric input device (e.g., a keyboard), a user interface (UI) navigation device (e.g., a mouse and/or touch screen), a drive unit, a signal generation device 132 (e.g., a speaker), and a network interface device.

The drive unit, such as a removable drive unit 136, includes a machine-readable medium on which is stored one or more sets of instructions and data structures embodying or utilized by any one or more of the methodologies or functions described herein. The instructions may also reside, completely or at least partially, within the memory and/or within the processor during execution thereof by the computer processing system. The instructions may further be transmitted or received over a network 140 via the network interface device utilizing any one of a number of well-known transfer protocols (e.g., Hypertext Transfer Protocol (HTTP)).

The network 140 may be a local area network (LAN), a wireless network, a metropolitan area network (MAN), a wide area network (WAN), a wireless network, a network of interconnected networks, the public switched telephone network (PSTN), an electrical power-based network (such as the X.10 protocol), and the like. Communication links include, but are not limited to, WiFi (e.g., IEEE 802.11), Bluetooth, Universal Serial Bus (USB), and the like. In one example embodiment, the network 140 may comprise one or more routers and/or device switches (not shown).

Figure 12A:
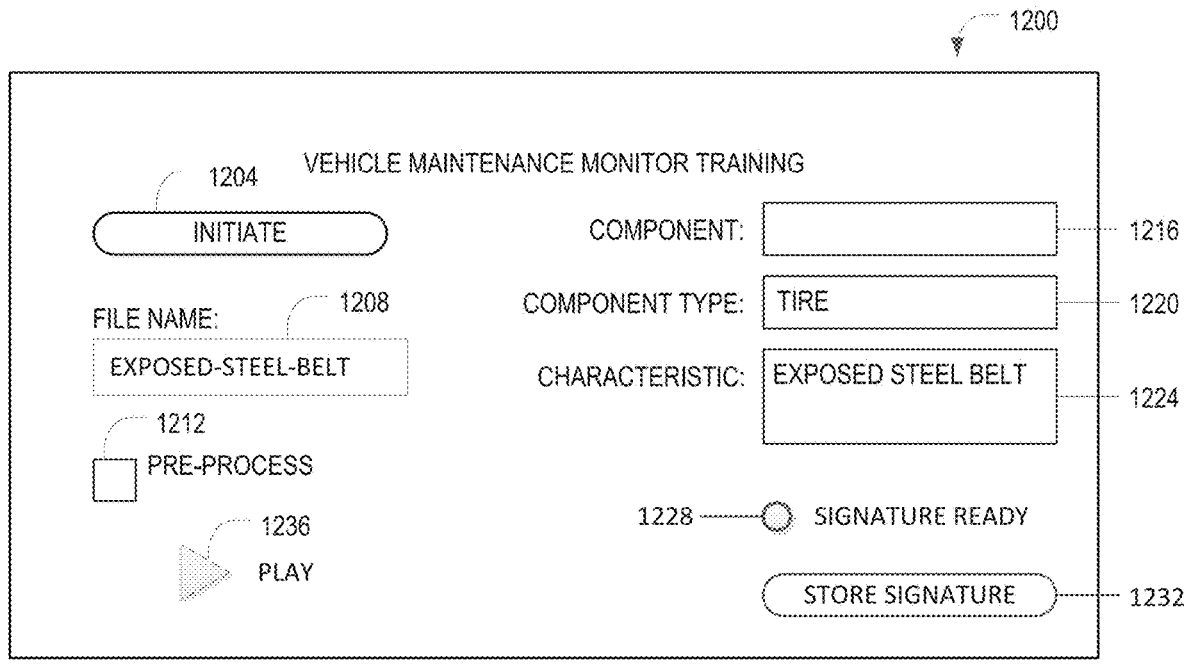
FIGS. 12A and 12B illustrate example user interfaces for training and utilizing the vehicle monitor, in accordance with an example embodiment.
Figure 12B:
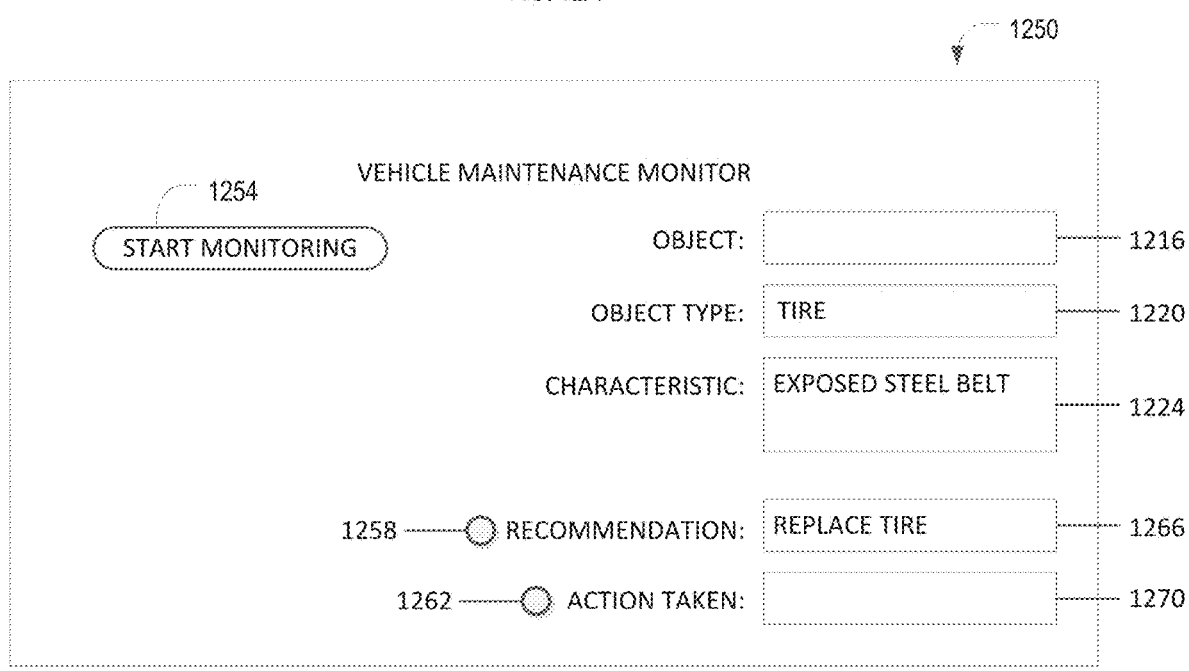

The vehicle monitor 112 optionally generates various user interfaces, such as the user interface of FIGS. 12A and 12B. The user interface of FIG. 12A enables a user to initiate the training of the vehicle monitor 112 and the user interface of FIG. 12B enables a user to initiate monitoring using the vehicle monitor 112.

In one example embodiment, the vehicle monitor 112 receives the audio signal from the microphone 108. The audio signal is optionally pre-processed to, for example, eliminate or mitigate noise or background sounds, and to isolate a particular sound in the audio signal. A signature of the audio signal is then generated. The audio signature is compared to signatures in a library of audio signatures; if a matching signature is found, the component, component type, characteristic(s), or any combination thereof corresponding to the audio signature listed in the library is identified and assigned to the monitored component. For example, the sound emitted by a worn water pump belt may be unique and an audio signature in the library corresponding to a worn water pump belt may be used to identify the condition of the belt. In another example, an audio signature may be used to identify the make, and possibly model, of an automobile.

In one example embodiment, the sound, temperature, location, speed of the vehicle, acceleration of the vehicle, or any combination thereof may be processed upon detection, periodically, at a prescheduled time, in response to a reception of a request, or in response to a substantial change in a vehicle parameter (e.g., a sound, temperature, location, speed, and acceleration of the vehicle). In one example embodiment, the audio signal, temperature, location, speed, and acceleration of the vehicle, or any combination thereof, may be sent to a cloud-based service, such as a service operating on computer 144, via the network 140 for processing. In the case of the audio signal, the cloud-based service may perform pre-processing, audio processing, signature generation, signature matching, or any combination thereof, as described herein. The vehicle parameters may be sent to the cloud-based service upon detection, periodically, at a prescheduled time, in response to a reception of a request, or in response to a substantial change in a vehicle parameter (e.g., a sound, temperature, location, speed, and acceleration of the vehicle).

Figure 2:
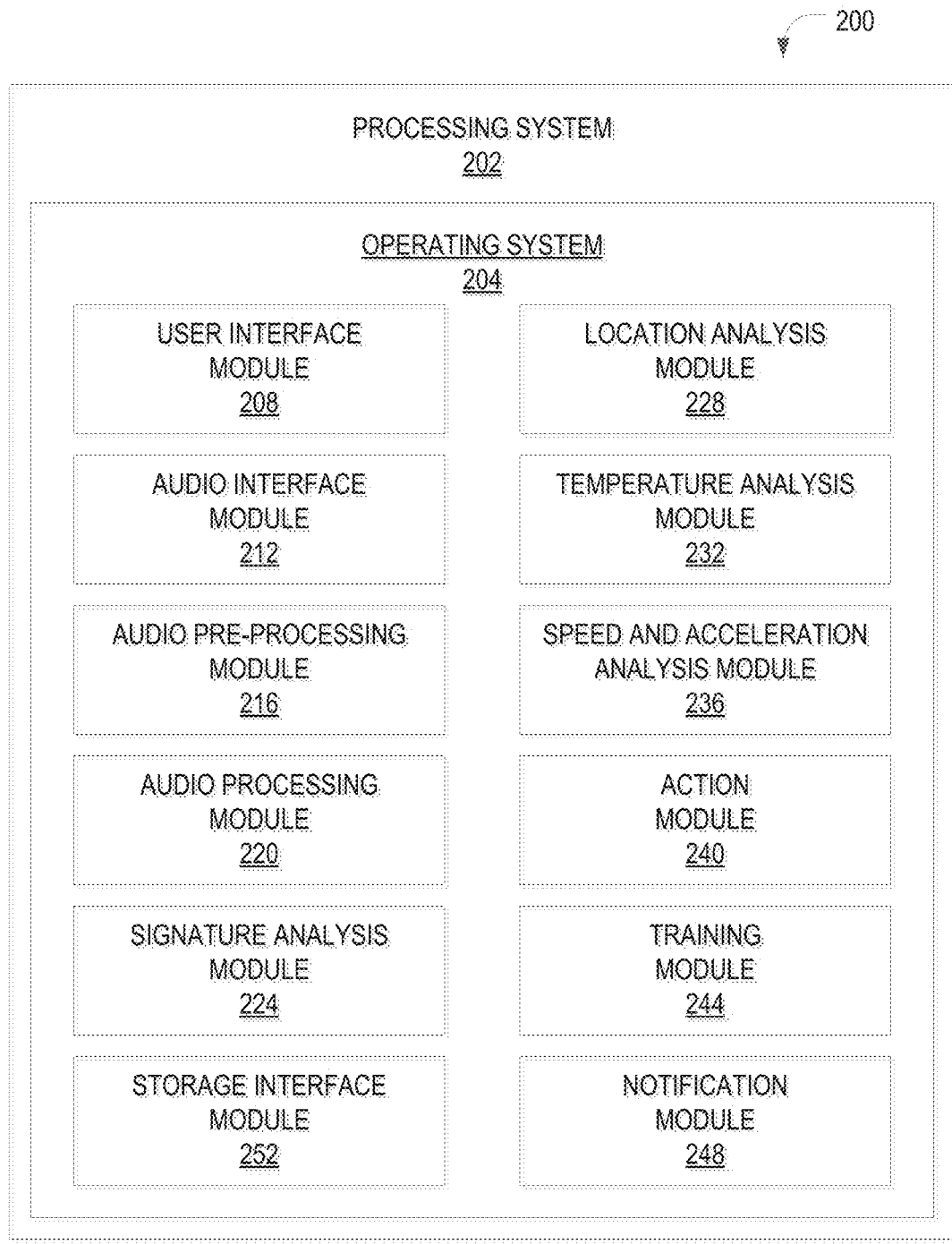
FIG. 2 is a block diagram of an example apparatus for monitoring a vehicle, in accordance with an example embodiment.

FIG. 2 is a block diagram of an example apparatus 200 for monitoring a vehicle, in accordance with an example embodiment. In one example embodiment, the apparatus 200 may serve as the vehicle monitor 112.

The apparatus 200 is shown to include a processing system 202 that may be implemented on a server, client, or other processing device that includes an operating system 204 for executing software instructions. In accordance with an example embodiment, the processing system 202 may include a user interface module 208, an audio interface module 212, an audio pre-processing module 216, an audio processing module 220, a signature analysis module 224, a location analysis module 228, a temperature analysis module 232, a speed and acceleration analysis module 236, an action module 240, a training module 244, and a notification module 248.

The user interface module 208 provides an interface for initiating the identification of a maintenance issue based on a monitored sound, a location of the vehicle, a speed of the vehicle, an acceleration of the vehicle, a temperature, and the like, as described more fully below by way of example in conjunction with FIG. 12B. An action, such as a maintenance action, may also be initiated or recommended based on the sound, the corresponding audio signature, the location of the vehicle, the speed of the vehicle, the acceleration of the vehicle, the temperature, and the like. The user interface module 208 also provides an interface for initiating training of the vehicle monitor 112, as described more fully below by way of example in conjunction with FIG. 12A.

The audio interface module 212 provides an interface for obtaining an audio signal, such as an audio signal captured by the microphone 108. The audio interface module 212 may receive a recorded audio signal from, for example, the computer 144 via the network 140. The audio interface module 212 may, for example, convert an analog audio signal to a digital audio signal, as described herein.

The audio pre-processing module 216 optionally processes the audio signal to isolate a particular sound. For example, a segment of the audio signal may be edited from a longer audio clip and/or a particular sound may be isolated from other sounds that occur contemporaneously.

The audio processing module 220 generates a signature, or "fingerprint," of the isolated audio signal. The signature is generated by considering a characteristic(s) of an audio waveform, such as frequency range, tempo, acoustic resonances, power in each of a plurality of frequency ranges, and the like. The generated audio signal is processed by, for example, the signature analysis module 224.

The signature analysis module 224 compares a signature generated by, for example, the audio processing module 220 to signatures in a library of signatures. If a match is found, the monitored component is identified as being the component corresponding to the library signature, as being of the component type corresponding to the library signature, as having the characteristic(s) of the component corresponding to the library signature, or any combination thereof.

The location analysis module 228 obtains a vehicle location from, for example, the location detection system 116 and determines if the location of the vehicle is substantially different from the previously recorded location. For example, if the latitude or longitude of the vehicle has changed more than a predefined threshold (such as by more than one minute latitude or longitude) from the vehicle's last waypoint, the location has changed substantially. The location analysis module 228 stores the location as a vehicle waypoint in a waypoint vector, as described more fully by way of example in conjunction with FIG. 4B.

The temperature analysis module 232 obtains one or more temperatures from the temperature sensor system 124 and determines if any of the temperatures is substantially different from a corresponding previously recorded temperature. The temperature analysis module 232 stores the temperatures that have changed substantially in a temperature array, as described more fully by way of example in conjunction with FIG. 4A.

The speed and acceleration analysis module 236 receives reports from the speed and acceleration detection system 120 of the speed of the vehicle, an instance of acceleration of the vehicle, or both. In one example embodiment, the speed is reported periodically, or if the speed exceeds a predefined speed threshold, and the acceleration is reported periodically, or if the acceleration exceeds a predefined acceleration threshold. For example, an acceleration that exceeds five miles per hour per second or a deceleration that exceeds ten miles per hour per second may be reported to the speed and acceleration analysis module 236. The speed and acceleration analysis module 236 stores the reported acceleration (or deceleration) value in a corresponding acceleration vector or deceleration vector, as described more fully by way of example in conjunction with FIGS. 3B and 3C. Similarly, the speed and acceleration analysis module 236 stores the reported vehicle speed in a corresponding speed vector, as described more fully by way of example in conjunction with FIG. 3A.

In one example embodiment, the speed and acceleration analysis module 236 maintains histograms of the speed, acceleration, deceleration, or any combination thereof. As noted above, an acceleration histogram or deceleration histogram that shows a large percentage of large values in comparison to smaller values may be indicative of rapid acceleration or deceleration, and therefore rapid tire wear. Similarly, a speed histogram that shows a large percentage of large values in comparison to smaller values may be indicative of rapid speed, and therefore more rapid engine and/or transmission wear. The speed and acceleration analysis module 236 analyzes the histograms for indications of maintenance issues, such as the need to inspect or replace tires. In one example, fuel consumption may be determined and used to determine, for example, when an engine flush is recommended (based on the fuel consumption). In one example, a component lifespan rating may be obtained from a tire manufacturer. The number of miles traveled by the tire plus the level of rapid acceleration and deceleration of the vehicle may be analyzed to determine the amount of wear the tire was subjected to. A projected replacement time for the tire may be determined based on the pace of wear.

The action module 240 identifies an action to be recommended, performed, or both based on the audio signal, the generated audio signature, the identified component, a characteristic of the component, a location of the vehicle, a speed of the vehicle, an acceleration of the vehicle, a temperature, and the like. The action module 240 may issue a notification, via the notification module 248, to a user, the notification recommending a particular action to perform. In one example embodiment, the action module 240 performs the identified action. The action to be performed or recommended may be based on a look-up table, rules in a rule-base, and the like.

The training module 244 captures an audio signal derived from a sound emitted by a vehicle component, generates an audio signature using, for example, the audio processing module 220, and stores the signature for future use. The captured audio signal may be provided by, for example, the microphone 108 via the audio interface module 212, and may be obtained as a recorded audio signal, audio waveform, and the like. The generated audio signature may be indexed according to the identity of the component, the type of component, a characteristic(s) of the component, and the like.

The notification module 248 issues recommendations determined by, for example, the action module 240. The notification module 248 may issue a recommendation, such as a suggestion to replace a tire on an automobile, to a user via the user interface module 208. The notification module 248 may activate an alarm, such as an audible alarm, a visual alarm, and the like. The alarm may alert a user, a company (such as a car repair shop), a processing system, and the like to the issuance of the recommendation.

FIG. 3A is an example speed data structure for logging the speed of the vehicle provided by the speed and acceleration detection system 120 in a speed vector 300, in accordance with an example embodiment. The speed vector 300 may be a table in a database and may be used to maintain a history of the speed exhibited by the vehicle. Each row 304 of the speed vector 300 corresponds to the speed of the vehicle at a corresponding time of day. Column 308 is a time field comprising the time of the corresponding speed notification, and column 312 is a speed field comprising the value of the speed indicated in the speed notification. In one example embodiment, the speed is measured in miles per hour.

FIG. 3B is an example acceleration data structure for logging instances of acceleration provided by the speed and acceleration detection system 120 in an acceleration vector 330, in accordance with an example embodiment. The acceleration vector 330 may be a table in a database and may be used to maintain a history of, for example, the instances of acceleration exhibited by the vehicle. Each row 334 of the acceleration vector 330 corresponds to an instance of acceleration. Column 338 is a time field comprising the time of the corresponding acceleration notification, and column 342 is an acceleration field comprising the value of the acceleration indicated in the acceleration notification. In one example embodiment, the acceleration is measured in miles per hour per second.

FIG. 3C is an example deceleration data structure for logging instances of deceleration provided by the speed and acceleration detection system 120 in a deceleration vector 360, in accordance with an example embodiment. The deceleration vector 360 may be a table in a database and may be used to maintain a history of, for example, the instances of deceleration exhibited by the vehicle. Each row 364 of the deceleration vector 360 corresponds to an instance of deceleration. Column 368 is a time field comprising the time of the corresponding deceleration notification, and column 372 is a deceleration field comprising the value of the deceleration indicated in the acceleration notification. In one example embodiment, the deceleration is measured in miles per hour per second.

Figure 4A:
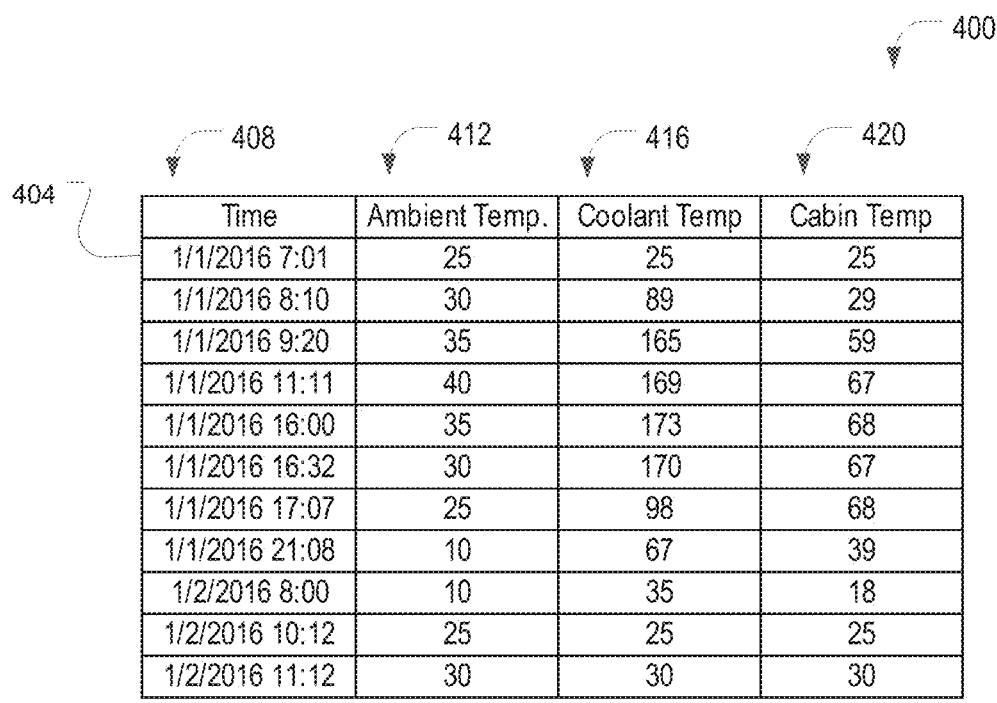
FIG. 4A is an example temperature data structure for logging temperatures provided by a temperature sensor system in a temperature array, in accordance with an example embodiment.

FIG. 4A is an example temperature data structure for logging temperatures provided by the temperature sensor system 124 in a temperature array 400, in accordance with an example embodiment. The temperature array 400 may be a table in a database and may be used to maintain a history of, for example, the outdoor temperature that the vehicle is exposed to. Each row 404 of the temperature array 400 corresponds to a notification from the temperature sensor system 124 of a substantial temperature change. Column 408 is a time field comprising the time of the corresponding temperature notification, column 412 is a temperature field comprising the ambient temperature indicated in the temperature notification, column 416 is a temperature field comprising the temperature of the engine coolant indicated in the temperature notification, and column 420 is a temperature field comprising the cabin temperature indicated in the temperature notification.

Figure 4B:
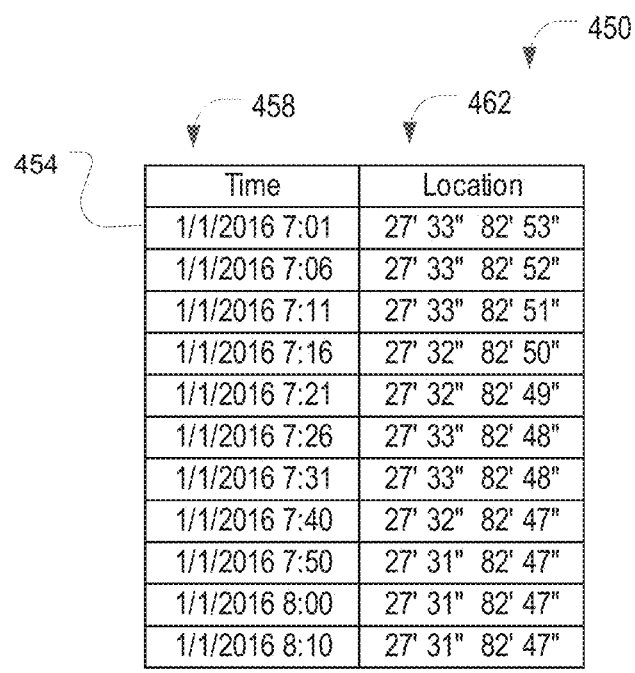
FIG. 4B is an example location data structure for logging waypoints provided by a location detection system in a waypoint vector, in accordance with an example embodiment.

FIG. 4B is an example location data structure for logging waypoints provided by the location detection system 116 in a waypoint vector 450, in accordance with an example embodiment. The waypoint vector 450 may be a table in a database and may be used to maintain a history of, for example, the locations that the vehicle has traversed. Each row 454 of the waypoint vector 450 corresponds to a location of the vehicle (where the recorded location is substantially different from a preceding waypoint in the waypoint vector 450). Column 458 is a time field comprising the time that the vehicle was at the location, and column 462 is a location field comprising the location indicated in the location notification. In one example embodiment, the location is identified by latitude and longitude.

Figure 5:
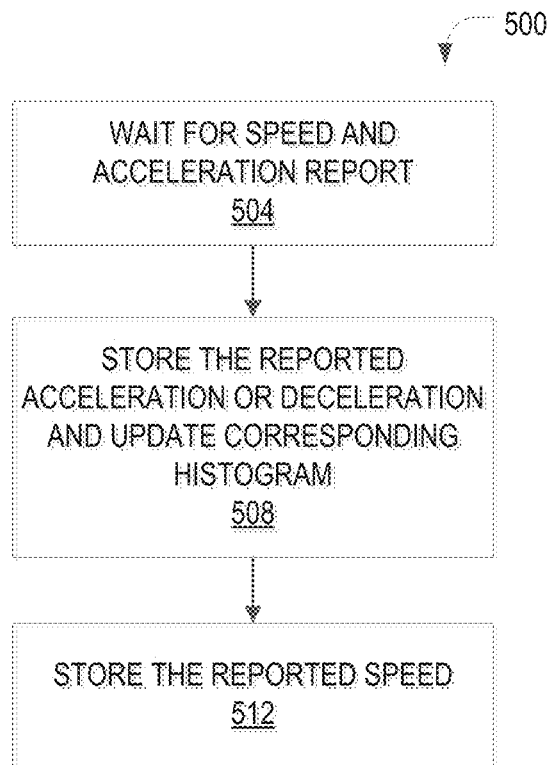
FIG. 5 is a flowchart for an example method for recording speed and acceleration data for a vehicle, in accordance with an example embodiment.

FIG. 5 is a flowchart for an example method 500 for recording speed and acceleration data for a vehicle, in accordance with an example embodiment. In one example embodiment, one or more of the operations of the method 500 may be performed by the speed and acceleration detection system 120, the speed and acceleration analysis module 236, the action module 240, the notification module 248, or any combination thereof.

In one example embodiment, the speed and acceleration analysis module 236 waits for a report from the speed and acceleration detection system 120 of a speed of the vehicle, an instance of acceleration that exceeds a predefined threshold, or both (operation 504). For example, an acceleration that exceeds 6 miles per hour per second or a deceleration that exceeds 6 miles per hour per second is reported to the speed and acceleration analysis module 236. The speed and acceleration analysis module 236 stores the reported acceleration or deceleration value in the corresponding vector (the acceleration vector 330 or the deceleration vector 360) and updates the corresponding histogram (the acceleration histogram or the deceleration histogram) (operation 508). As noted above, an acceleration histogram or deceleration histogram that shows a larger proportion of large values in comparison to small values may be indicative of rapid tire wear.

The speed and acceleration analysis module 236 stores the reported speed of the vehicle in the speed vector 300 (operation 512). The method 500 then proceeds with operation 504.

Figure 6:
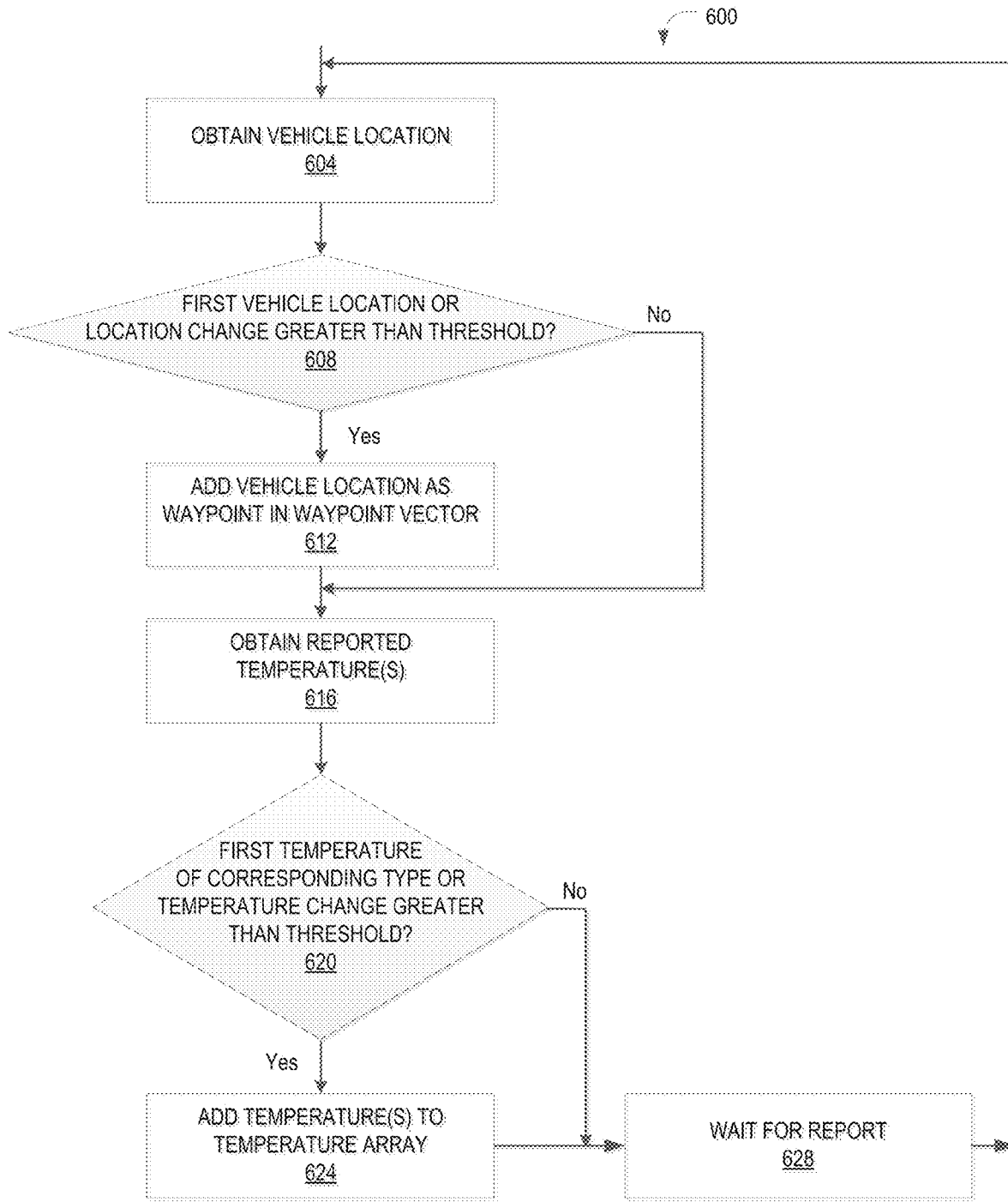
FIG. 6 is a flowchart for an example method for recording location and temperature data for a vehicle, in accordance with an example embodiment.

FIG. 6 is a flowchart for an example method 600 for recording location and temperature data for a vehicle, in accordance with an example embodiment. In one example embodiment, one or more of the operations of the method 600 may be performed by the location analysis module 228, the speed and acceleration analysis module 236, the action module 240, the notification module 248, or any combination thereof.

In one example embodiment, a vehicle location is obtained from the location detection system 116 (operation 604). A test is performed to determine if the obtained vehicle location is the first location obtained for the vehicle or if the location is substantially different from the previously recorded location (operation 608). For example, if the latitude or longitude of the vehicle has changed more than a predefined threshold (such as by more than one minute in latitude or longitude) from the vehicle's last waypoint, the location has changed substantially. If the obtained location is not the first location obtained for the vehicle and the location is not substantially different from the previously recorded location, the method 600 proceeds with operation 616; otherwise, the location is added as a vehicle waypoint in the waypoint vector 450 (operation 612).

During operation 616, one or more temperatures are obtained from the temperature sensor system 124. A test is performed to determine if any of the obtained temperatures is the first temperature of the corresponding type (such as first ambient temperature, first cabin temperature, first coolant temperature, and the like) obtained for the vehicle or if any of the temperatures are substantially different from a corresponding previously recorded temperature (operation 620). For example, if the ambient temperature has fallen by ten degrees Fahrenheit or has fallen below 37 degrees Fahrenheit, then the ambient temperature has changed substantially. If all of the obtained temperatures are not the first temperature obtained for the corresponding type and if all of the obtained temperatures are not substantially different from a corresponding previously recorded temperature, the method 600 proceeds with operation 628; otherwise, the temperatures that are the first temperature(s) for the corresponding temperature type or that have changed substantially are added to the temperature array 400 (operation 624). During operation 628, the method 600 waits a predefined amount of time (such as five minutes) and then proceeds with operation 604.

FIG. 7 is an example audio signature data structure 700 for determining a maintenance issue based on a monitored sound, in accordance with an example embodiment. The audio signature data structure 700 may be indexed by an audio identifier, an audio signature, an component type, a characteristic of a component, or any combination thereof. Each row 704 of the audio signature data structure 700 corresponds to an audio signature. Column 708 is an audio signature identifier field, column 712 identifies the audio signature that corresponds to the audio signature identifier, column 716 identifies the type of component that corresponds to the audio signature (such as a tire, water pump, and the like), and columns 720 and 724 identify characteristics of the identified component type.

Figure 8:
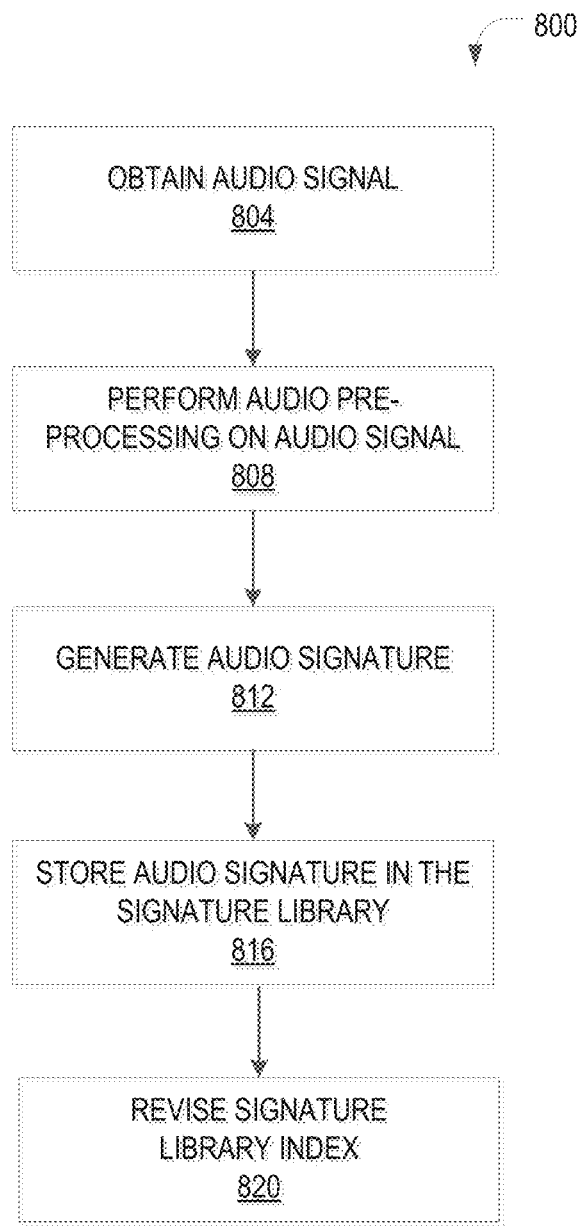
FIG. 8 is a flowchart for an example method for training the audio analyzer for a vehicle monitor, in accordance with an example embodiment.

FIG. 8 is a flowchart for an example method 800 for training the audio analysis for a vehicle monitor 112, in accordance with an example embodiment. In one example embodiment, one or more of the operations of the method 800 may be performed by the audio interface module 212, the audio pre-processing module 216, the audio processing module 220, the signature analysis module 224, the training module 244, or any combination thereof.

In one example embodiment, training is conducted to introduce new audio signatures into the signature library. For example, the sound emitted by a known component of an automobile, such as the sound emitted by a tire, may be captured by the training module 244. In one example embodiment, a recording of the sound emitted by the component is provided to the training module 244. The audio signal may optionally be pre-processed (for example, to eliminate background noise, clarify the signal, and the like) and then processed to generate a signature of the audio signal. The signature is stored in the signature library and is indexed according to the identity of the component, the type of component, a characteristic(s) of the component, and the like.

In one example embodiment, an audio signal is generated based on, for example, a sound captured by the microphone 108 via, for example, the audio interface module 212 (operation 804). The captured sound is emitted by a known component but may contain sounds emitted by other objects, noise generated by the environment (such as echoes), noise generated by the electronic equipment (such as the microphone 108), and the like.

In one example embodiment, the audio signal is optionally pre-processed, for example, to isolate a particular sound emitted by the known component (operation 808). For example, as described above, a segment of the audio signal may be edited from a longer audio clip, a particular sound may be isolated from other sounds that occur contemporaneously, or both. The audio pre-processing module 216 may perform the optional pre-processing.

The audio signature is generated based on the audio signal (operation 812). For example, the signature may be generated by considering characteristics of an audio waveform, such as a frequency range(s), a tempo, acoustic resonances, power for each of a plurality of frequency ranges, and the like. In one example embodiment, the generated signature is stored for future use in a signature library (operation 816) and the library index is revised (operation 820) by, for example, the training module 244 based upon profile information for the sound provided by a user, a software application, and the like. The method 800 then ends.

Figure 9:
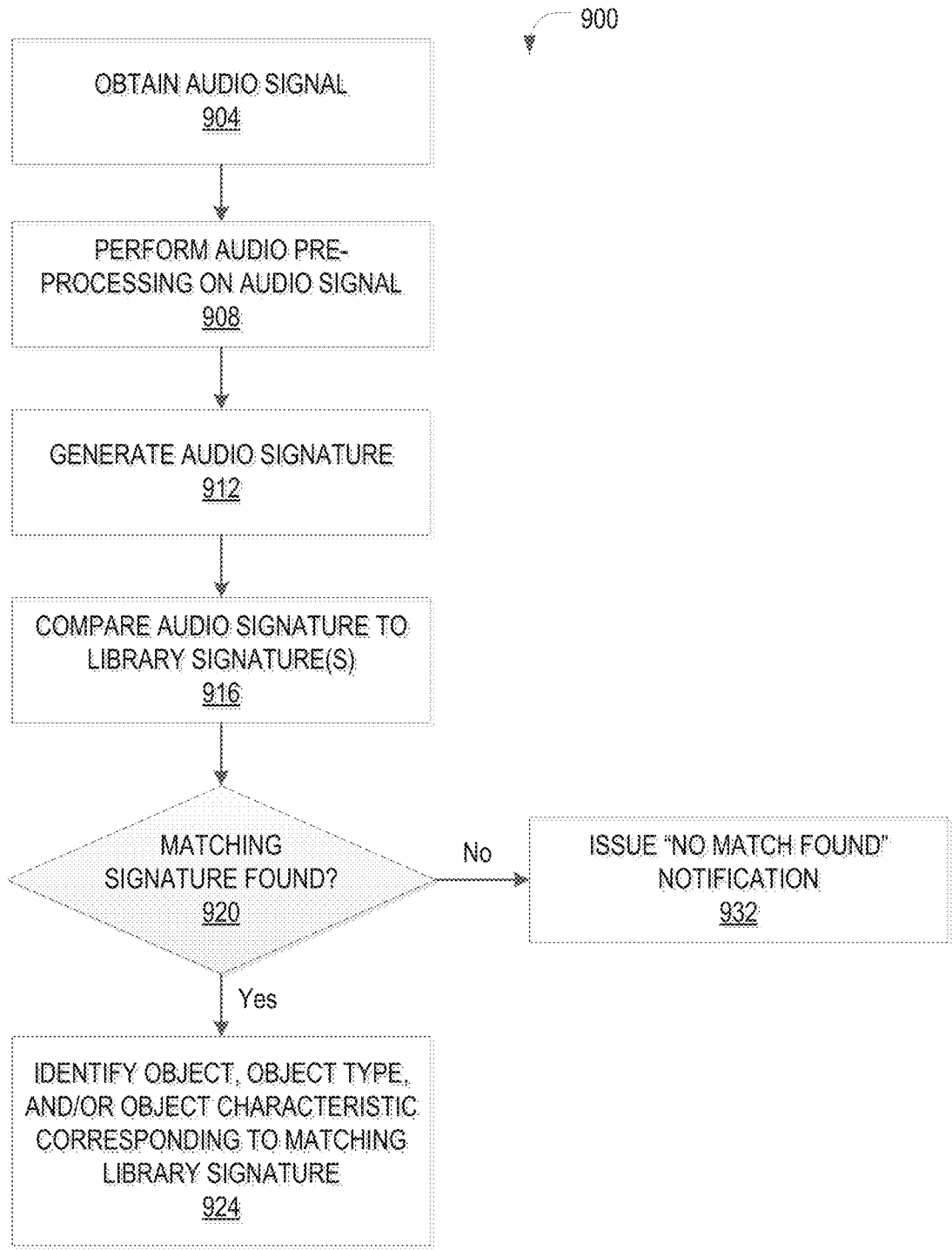
FIG. 9 is a flowchart for an example method for identifying a source of sounds emitted by components of a vehicle, in accordance with an example embodiment.

FIG. 9 is a flowchart for an example method 900 for identifying a source of sounds emitted by components of a vehicle, in accordance with an example embodiment. In one example embodiment, one or more of the operations of the method 900 may be performed by the audio interface module 212, the audio pre-processing module 216, the audio processing module 220, the signature analysis module 224, the action module 240, the notification module 248, or any combination thereof.

In one example embodiment, an audio signal is obtained from, for example, the microphone 108 via, for example, the audio interface module 212 (operation 904). The captured sound may be emitted by an unknown component of the vehicle and may contain sounds emitted by other components or objects, noise generated by the environment (such as echoes), noise generated by the electronic equipment (such as the microphone 108), or any combination thereof.

In one example embodiment, the audio signal is optionally pre-processed, for example, to isolate a particular sound (operation 908). For example, as described above, a segment of the audio signal may be edited from a longer audio clip and/or a particular sound may be isolated from other sounds that occur contemporaneously. The audio pre-processing module 216 may perform the optional pre-processing.

The audio signature is generated based on the audio signal (operation 912). For example, the signature is generated by considering characteristics of an audio waveform, such as a frequency range(s), a tempo, acoustic resonances, a power of each of a plurality of frequency ranges, and the like. The audio signature is generated by the audio processing module 220 for processing by, for example, the signature analysis module 224.

In one example embodiment, the generated signature is compared to signatures in a library of signatures by, for example, the signature analysis module 224 (operation 916). For example, characteristics of the two audio waveforms, such as the tempos of the waveforms, may be compared. A test is then performed to determine if a match is found (operation 920). If the generated signature matches none of the signatures in the library of signatures, an error notification is issued indicating that no match has been found (operation 932) and the method 900 ends; otherwise, the monitored component is identified as being the component that corresponds to the signature in the library, as being of the type of component that corresponds to the signature in the library, as having the characteristic(s) that corresponds to the signature in the library, or any combination thereof (operation 924). In one example embodiment, fuzzy matching may be used in comparing the signatures. For example, if the parameters of the generated signature are within a ten percent range of the corresponding parameters of the library signature, a match is confirmed. In one example embodiment, a number of signatures may be related. For example, a fan belt may emit different sounds corresponding to different levels of wear. Some signatures in the library may correspond to different levels of acceptable wear (i.e., no replacement is needed) and other signatures may correspond to different levels of unacceptable wear (i.e., replacement is recommended). The generated signature may be compared to each of the library signatures using fuzzy matching to determine the level of wear of the fan belt.

FIG. 10 is an example maintenance identification data structure 1000 for identifying a maintenance issue based on an audio signature, a vehicle location, a speed of a vehicle, an acceleration of a vehicle, a temperature, and the like, in accordance with an example embodiment. The maintenance identification data structure 1000 may be a table in a database. Each row 1004 of the maintenance identification data structure 1000 corresponds to a maintenance issue in a maintenance library. Column 1008 is a maintenance issue field comprising an identification of the maintenance issue; column 1012 is an audio signature identifier field comprising an identification number for an audio signature corresponding to the maintenance issue; column 1016 is a location identifier field comprising an identification of a waypoint, or a description of a series of waypoints, corresponding to the maintenance issue; column 1020 is a speed field comprising a speed, or a description of a history of speeds, corresponding to the maintenance issue; column 1024 is an acceleration field comprising an acceleration, or a description of a history of accelerations, corresponding to the maintenance issue; and column 1028 is a temperature field comprising a temperature, or a description of a history of temperatures, corresponding to the maintenance issue.

Figure 11:
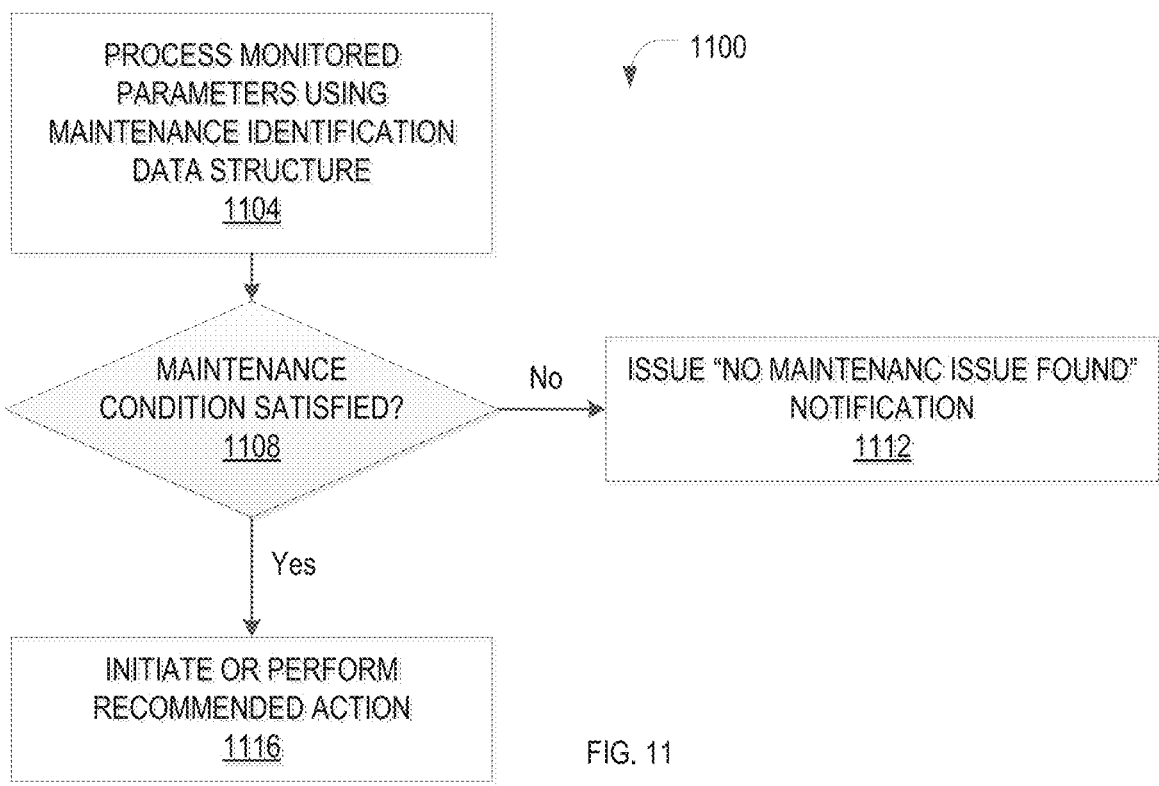
FIG. 11 is a flowchart for an example method for identifying a maintenance issue of a vehicle, in accordance with an example embodiment.

FIG. 11 is a flowchart for an example method 1100 for identifying a maintenance issue of a vehicle, in accordance with an example embodiment. In one example embodiment, one or more of the operations of the method 1100 may be performed by the action module 240, the speed and acceleration analysis module 236, the notification module 248, or any combination thereof.

In one example embodiment, the action module 240 checks the maintenance identification data structure 1000 for a vehicle maintenance issue based on the recorded vehicle speed, vehicle acceleration, vehicle deceleration, vehicle location, vehicle temperature, and the like (operation 1104). For example, the action module 240 may compare the data in the speed vector 300, the acceleration vector 330, the deceleration vector 360, the temperature array 400, and the waypoint vector 450 to the conditions of each maintenance issue in the maintenance identification data structure 1000. A test is performed to determine whether any of the maintenance conditions in the maintenance identification data structure 1000 are satisfied (operation 1108). If the maintenance conditions of all potential maintenance issues are not met, a "no maintenance issue found" message is issued (operation 1112); otherwise, the recommended action is performed, a notification is issued, or both (operation 1116). For example, a notification may be issued via the notification module 248 to a mobile device of a user indicating that wheel bearings in an automobile may need to be replaced. The method 1100 then ends.

FIGS. 12A and 12B illustrate example user interfaces 1200, 1250 for training and utilizing the vehicle monitor 112, in accordance with an example embodiment. The user interface 1200 may be generated by, for example, the user interface module 208.

As illustrated in FIG. 12A, a user may select an initiate button 1204 to start the training process. If a file name is entered in a file field 1208, the audio stored in the named file will be processed by the method 800 upon the user selecting the initiate button 1204; if no file name is entered in the file field 1208, the audio captured by the microphone 108 will be processed by the method 800 upon the user selecting the initiate button 1204. If the pre-process button 1212 is selected, optional operation 808 will be performed and the audio signal will be pre-processed. In one example embodiment, the pre-processing is automatically performed, as needed, based on the quality of the audio signal. Once the sound has been isolated, a user may play the sound by selecting the play button 1236.

Prior to storing the audio signature, the identity of the component (if known), the component type (if known), and one or more characteristics of the component (if known) are entered by the user in a component field 1216, a component type field 1220, and a characteristics field 1224, respectively. Once the signature is generated and ready for storage, as indicated by a signature ready indicator 1228, the user may add the audio signature to the signature library by selecting the store signature button 1232. In one example embodiment, once the signature is generated and ready for storage, the audio signature is automatically stored in the signature library.

As illustrated in FIG. 12B, a user may select a start monitoring button 1254 to start the vehicle monitoring process. Once a maintenance issue is identified, a recommendation indicator 1258 will be activated if a maintenance recommendation has been issued. Similarly, an action indicator 1262 will be activated if a maintenance action has been taken. If the recommendation indicator 1258 is activated, the corresponding recommendation is displayed in a recommendation field 1266. If the action indicator 1262 is activated, the corresponding action is displayed in an action field 1270.

If either the recommendation indicator 1258 or the action indicator 1262 is activated, the identity of the component (if known), the component type (if known), and one or more characteristics of the component (if known) are displayed in the component field 1216, the component type field 1220, and the characteristics field 1224, respectively.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Example Mobile Device

Figure 13:
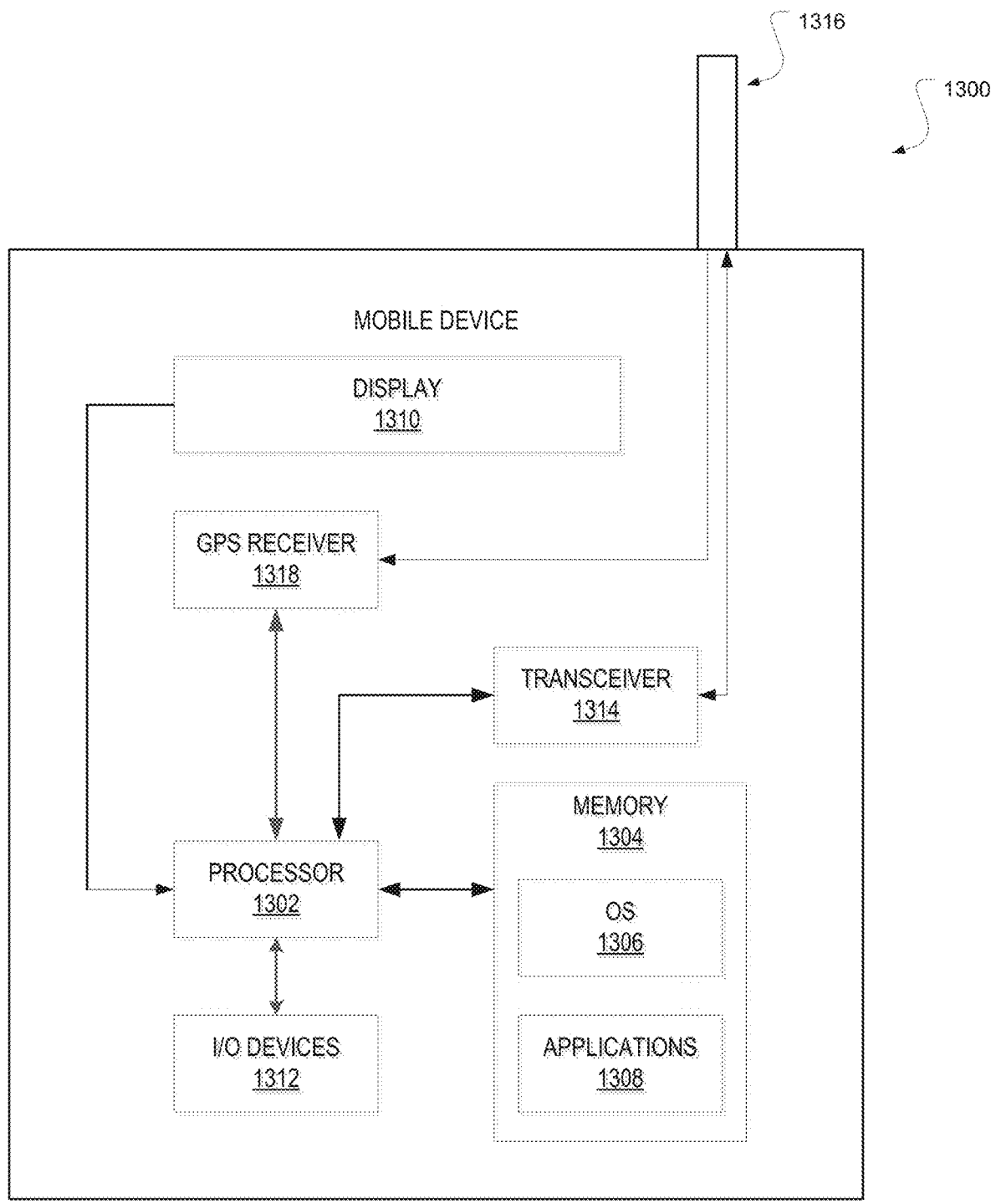
FIG. 13 is a block diagram illustrating an example mobile device, according to an example embodiment.

FIG. 13 is a block diagram illustrating an example mobile device 1300, according to an example embodiment. The mobile device 1300 may include a processor 1302. The processor 1302 may be any of a variety of different types of commercially available processors suitable for mobile devices (for example, an XScale architecture microprocessor, a microprocessor without interlocked pipeline stages (MIPS) architecture processor, or another type of processor 1302). A memory 1304, such as a random access memory (RAM), a flash memory, or another type of memory, is typically accessible to the processor 1302. The memory 1304 may be adapted to store an operating system (OS) 1306, as well as application programs 1308, such as a mobile location enabled application that may provide location-based services (LBSs) to a user. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 14:
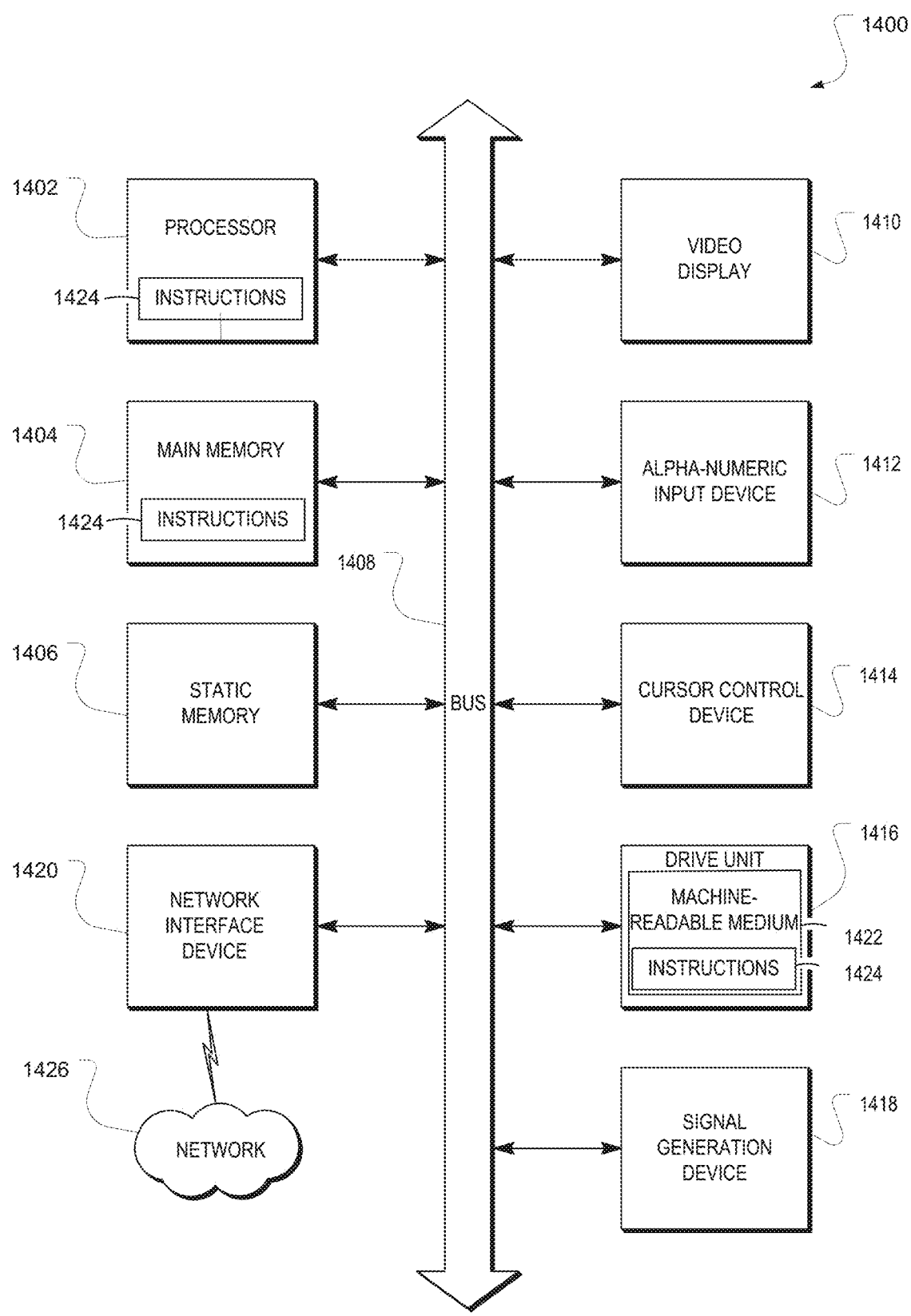
FIG. 14 is a block diagram of a machine within which instructions may be executed for causing the machine to perform any one or more of the methodologies discussed herein.

FIG. 14 is a block diagram of a machine in the example form of a computer system 1400 within which instructions may be executed for causing the machine to perform any one or more of the methodologies discussed herein. In one example embodiment, the machine may be the example apparatus 200 of FIG. 2 for monitoring a vehicle. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404, and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker), and a network interface device 1420.

Machine-Readable Medium

The drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media 1422. The instructions 1424 may also reside within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more data structures or instructions 1424. The term "machine-readable medium" shall also be taken to include any tangible medium that is capable of storing, encoding, or carrying the instructions 1424 for execution by the machine and that cause the machine to perform any one or more of the methodologies of the present invention, or that is capable of storing, encoding, or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EE-PROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., hypertext transfer protocol (HTTP)). Examples of communications networks 1426 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 1424 for execution by the machine, and includes digital or analog communications signals or other intangible media to facilitate communication of such instructions 1424.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
   a processing device configured to perform operations comprising:
   computing a difference between a current location of a vehicle and a past location of the vehicle;
   comparing, to a threshold, the difference between the current location of the vehicle and the past location of the vehicle;
   storing the current location of the vehicle in a history of locations in response to determining that the difference between the current location of the vehicle and the past location of the vehicle exceeds the threshold; and
   determining an action based on the history of locations of the vehicle that include the past location and the current location, the history of the locations affecting a characteristic of a component of the vehicle.

2. The apparatus of claim 1, wherein the processing device is further configured to perform operations comprising:
   obtaining an audio signal and analyzing the audio signal to generate an audio signature; and
   identifying the characteristic of the component of the vehicle based on the audio signature.

3. The apparatus of claim 2, wherein the processing device is further configured to perform operations comprising identifying the component and a component type based on the audio signature.

4. The apparatus of claim 2, wherein the processing device is further configured to perform operations comprising storing the audio signature in a signature library and generating an index according to the characteristic of the component.

5. The apparatus of claim 2, wherein the processing device is further configured to perform operations comprising storing the audio signature in a signature library and generating an index according to an identity of the component or a type of the component.

6. The apparatus of claim 2, wherein the characteristic is identified by comparing the audio signature to one or more signatures in a library of signatures.

7. The apparatus of claim 1, wherein the determining the action is based on a speed of the vehicle, an acceleration of the vehicle, a monitored temperature, a temperature of the component of the vehicle, or a combination thereof.

8. The apparatus of claim 1, wherein a sound is monitored periodically, at a prescheduled time, in response to a reception of a measurement request, and in response to a change in an audio signal.

9. A method comprising:
computing a difference between a current location of a vehicle and a past location of the vehicle;
comparing, to a threshold, the difference between the current location of the vehicle and the past location of the vehicle;
storing, by one or more processors, the current location of the vehicle in a history of locations in response to determining that the difference between the current location of the vehicle and the past location of the vehicle exceeds the threshold; and
determining, by the one or more processors, an action based on the history of locations of the vehicle that include the past location and the current location, the history of the locations affecting a characteristic of a component of the vehicle.

10. The method of claim 9 further comprising:
obtaining an audio signal and analyzing the audio signal to generate an audio signature; and
identifying the characteristic of the component of the vehicle based on the audio signature.

11. The method of claim 10, further comprising identifying the component based on the audio signature.

12. The method of claim 10, further comprising identifying a component type based on the audio signature.

13. The method of claim 10, further comprising storing the audio signature in a signature library and generating an index according to the characteristic of the component.

14. The method of claim 10, wherein the characteristic is identified by comparing the audio signature to one or more signatures in a library of signatures.

15. The method of claim 9, wherein the determining of the action is based on a temperature of the component of the vehicle, a speed of the vehicle, an acceleration of the vehicle, a monitored temperature, or a combination thereof.

16. The method of claim 9, wherein a sound is monitored periodically, at a prescheduled time, in response to a reception of a measurement request, and in response to a change in an audio signal.

17. An apparatus comprising:
a processing device configured to perform operations comprising:
detecting a change to a location of a vehicle;
initiating processing, in response to detecting the change, of a signal that indicates a condition of a component of the vehicle;
comparing the signal to a list of maintenance issues stored in a maintenance library;
determining an action based on the comparing indicating the signal corresponds to a maintenance issue stored in the maintenance library; and
transmitting a notification of the action to a user device.

18. The apparatus of claim 17, wherein the processing device is further configured to perform operations comprising:
receiving an input that indicates for the processing device to initiate monitoring of the condition of the component of the vehicle, wherein the notification of the action is transmitted to the user device based at least in part on receiving the input.

19. The apparatus of claim 17, wherein the processing device is further configured to perform operations for transmitting the notification of the action to the user device comprising:
transmitting an indication of an identity of the component of the vehicle, a component type of the component of the vehicle, one or more characteristics of the component of the vehicle, or a combination thereof.

20. The apparatus of claim 17, wherein the processing device is further configured to perform operations comprising:
computing a difference between a current location of the vehicle and a past location of the vehicle;
comparing, to a threshold, the difference between the current location of the vehicle and the past location of the vehicle;
storing the current location of the vehicle in a history of locations in response to determining that the difference between the current location of the vehicle and the past location of the vehicle satisfies the threshold; and
determining the action based on the history of locations of the vehicle that include the past location and the current location, the history of the locations affecting a characteristic of the component of the vehicle.

* * * * *